Patented Aug. 31, 1954

2,688,012

UNITED STATES PATENT OFFICE 2,688,012

INTERPOLYMERS OF ACRYLONITRILE, METHACRYLONITRILE, AND 2-METHYL-5-VINYL PYRIDINE

David W. Chaney, Nether Providence Township, Delaware County, and Howard M. Hoxie, Chester, Pa., assignors to American Viscose Corporation, Wilmington, Del., a corporation of Delaware No Drawing. Application March 23, 1951, Serial No. 217,284

2 Claims. (Cl. 260—80.5)

This invention relates to new ternary polymers having valuable properties and to shaped articles formed therefrom.

The copolymerization of a compound containing basic tertiary nitrogen with acrylonitrile is known to impart receptivity for the acid dyestuffs to the polymerized acrylonitrile. Copolymers consisting of acrylonitrile and from 2 to 10 percent of vinylpyridine have good receptivity for the dyestuffs.

The present invention provides new ternary polymers of from 70 to 84 percent acrylonitrile, from 1 to 10 percent of a vinyl-substituted heterocyclic tertiary amine, and from 6 to 20 percent of methacrylonitrile. It has been found that articles, such as fibers or films, formed from these new ternary polymers containing acrylonitrile, a vinyl-substituted heterocyclic tertiary amine, and methacrylonitrile in the polymer molecule have remarkably enhanced receptivity for the acid dyes and can be dyed to much deeper, more intense shades than articles formed under the same conditions from copolymers consisting of acrylonitrile and an equivalent proportion of the vinyl-substituted heterocyclic tertiary amine, and dyed under the same dyeing conditions. The increase in dye receptivity exhibited by the articles comprising the ternary polymers is obtained by the use of amounts of methacrylonitrile which do not appreciably damage the other desirable physical properties, such as toughness, tenacity, thermal stability, etc., of articles comprising high acrylonitrile polymers. The improvement in dye receptivity of the terpolymers containing methacrylonitrile is surprising, since polymethacrylonitrile itself does not have receptivity for the acid dyes.

The new ternary polymers may be synthesized from mixtures of the monomers in the desired proportions, or by continuous addition of the mixed monomers to a suitable reactor maintained under polymerization conditions. The interpolymerization may be performed in aqueous suspension preferably in the presence of an emulsifying agent. The suspension or emulsion may be attained by any agitation method, for example by tumbling the reactor, or through the use of any suitable stirring device. The polymerization is usually catalyzed by an oxygen-yielding peroxy catalyst and by heating to temperatures of from 40 to 100° C. When the polymerization is complete, the terpolymer is separated from the unreacted monomers, if any, and from the aqueous suspension medium by any suitable procedure, for example by steam distillation. The terpolymer may then be filtered and dried.

Suitable oxygen-yielding compounds which may be used to catalyze the polymerization are hydrogen peroxide, the organic peroxides such as benzyl peroxide, t-butyl hydroperoxide and acetyl peroxide, the organic percarbonates such as isopropyl percarbonates, and the inorganic peroxides such as sodium peroxide, sodium perborate, sodium persulfate and other water soluble salts of the same or different peroxy acids. Azo catalysts, such as azo-2,2'-di-isobutyronitrile may be used advantageously in the polymerization. Only small proportions of the peroxy compounds are required and used. Generally, from 0.005 percent to 0.5 percent of the catalyst is sufficient. Larger proportions of the catalyst may be used if desired. The catalyst may be activated by the use of triethanolamine, sodium bisulfite, or other material which promotes the formation of free radicals, and when such activators are used, lower polymerization temperatures, for example temperatures in the range of 0 to 40° C. may be employed.

The new ternary polymers may also be produced by a special solution polymerization in which the solution is saturated with a mixture of the three monomers in predetermined ratio. The catalyst, or a portion thereof, is added and the interpolymerization is conducted just at reflux temperature by continuously adding a mixture of the monomers in predetermined proportion corresponding to the proportion of the monomers in the initial polymer, to the mass at such a rate as to keep the reflux temperature and rate substantially constant. In this manner, the desired uniform concentration of each monomer is maintained in the reactor and the products are substantially homogeneous with respect to both composition and molecular weight. The catalyst, in solution, may be added to the polymerizing mass continuously at a controlled rate to maintain the catalyst constant throughout the reaction.

The interpolymerization may be conducted in the presence of molecular weight regulators which act as chain terminators and prevent the formation of very large molecular weight increments. Such regulators are exemplified in the high molecular weight aliphatic mercaptans, such as dodecyl mercaptan, dithioglycidol and in carbon tetrachloride.

The vinyl-substituted heterocyclic tertiary amines which may be interpolymerized with acrylonitrile and methacrylonitrile to produce the ternary polymers of the invention include the various isomeric vinylpyridines such as 2-vinylpyridine, 3-vinylpyridine, and 4-vinylpyridine, the vinyl-substituted alkyl pyridines such as 4-ethyl-2-vinylpyridine, 5-ethyl-2-vinylpyridine, 4-methyl-3-vinylpyridine, 5-ethyl-3-vinylpyridine, 4,6-dimethyl-2-vinylpyridine, 2-methyl-5-vinylpyridine, and 6-methyl-2-vinylpyridine, the isomeric vinylpyrazines, the isomeric vinylquinolines, the vinyl oxazoles, the vinyl imidazoles and particularly 1-vinylimidazole and alkyl substituted 1-vinylimidazoles such as 2-, 4-, or 5-methylvinylimidazole, and the vinyl benzoxazoles.

The ternary polymers may be fabricated into filaments by dry spinning procedures. They may also be wet-spun by extruding a solution of the terpolymer in a suitable solvent into a coagulating bath comprising a liquid which is inert to the polymer and an extractive for the spinning solvent. Solutions of from 5 to 20 percent of the ternary polymer in the selected solvent may be used.

The ternary polymers are soluble in various solvents. In general, the ternary polymers are soluble in the solvents for copolymers consisting of acrylonitrile and the vinyl-substituted heterocyclic tertiary amine. The following are examples of solvents which may be used: N,N-dimethylformamide, N,N-dimethylacetamide, dimethyl sulfone, N-formylmorpholine, N-isopropyl-N-cyanomethylformamide, tetramethylene sulfoxide, and succinonitrile.

The coagulating bath may be, for example, a mixture of water and the spinning solvent, for example a mixture of water and dimethylacetamide, or a mixture of water and dimethylformamide, or it may be glycerol, a mixture of predominantly aromatic hydrocarbons such as the mixture available commercially under the trade designation Solvesso-100, isopropanol, etc.

The filaments formed in the coagulating baths are subjected to stretching operations for improvement in their tensile strength and elongation. This stretching may precede or follow washing to remove residual spinning solvent, or it may be performed concurrently with washing. Any suitable thread stretching device may be used. The fibers may be stretched on godets at a comparatively low temperature, for example from room temperature to 100° C. and subsequently after-stretched at elevated temperatures, or they may be stretched at elevated temperatures directly after leaving the coagulating bath. The stretched, oriented fibers may be stabilized by subjecting them to a heat treatment in a relaxed condition. For example, the fibers may be exposed to hot air or hot water in a relaxed, free-to-shrink condition, at temperatures of 90° C. to 180° C., and after the heat-treatment the fibers exhibit increased resistance to boiling water.

Instead of fibers, other shaped articles such as films, foils, sheets, casings, tubes, rods, etc. may be made.

Further details of the invention are set forth in the following examples, in which the parts are by weight unless otherwise stated.

*Example I*

Acrylonitrile, 2-vinylpyridine, and methacrylonitrile were interpolymerized under conditions selected to produce a terpolymer containing 77 percent acrylonitrile, 4 percent of 2-vinylpyridine and 19 percent of methacrylonitrile, as follows:

To 3000 parts of water there were added 81 parts of acrylonitrile, 0.5 part of 2-vinylpyridine, and 19 parts of methacrylonitrile, by weight. The saturated solution was brought to reflux at 84° C. 8.6 parts of potassium persulfate in 100 parts of water were added. As soon as interpolymerization set in, the continuous addition of a mixture consisting of 385 parts of acrylonitrile, 20 parts of 2-vinylpyridine, and 95 parts of methacrylonitrile was started, and continued over a period of 65 minutes at a constantly controlled rate to maintain reflux at 83–84° C. The ternary polymer was coagulated by the addition of a small amount of aqueous calcium chloride solution to the mass, filtered, washed, and dried.

A standardized dyebath was prepared by dissolving 3% of sulfuric acid (96%) and 2% of the acid dye Wool Fast Scarlet G Supra (percentages on the weight of the article to be dyed) in water. Films cast from a dimethylacetamide solution of this ternary polymer were entered into the dyebath at 55° C., the bath was brought to the boil in 10 minutes and boiled for 1 hour. The films were thereby dyed to a deeper shade of red than a film formed under the same conditions from a copolymer consisting of 96 percent of acrylonitrile and 4 percent of 2-vinylpyridine, and dyed under the same conditions.

*Example II*

A terpolymer of 84 percent acrylonitrile, 11 percent methacrylonitrile and 5 percent of 2-vinylpyridine was prepared in an aqueous system containing 1.0 percent of potassium persulfate and 0.1 percent of Daxad 11 (a commercial mixture of sodium salts of short chain alkyl naphthalene sulfonic acids marketed by Dewey-Almy Chemical Co. of New York), at a water/monomer ratio of 4:1. The terpolymer, which was obtained in a yield of 96.3 percent, was coagulated, filtered, washed and dried in the usual way. It had a specific viscosity of 0.240 at concentrations of 0.1 percent in dimethylformamide.

A 16 percent solution of the terpolymer in dimethylacetamide was extruded through a spinneret into a setting bath comprising a mixture of water and dimethylacetamide at 30° C., to obtain fibers which were processed in the conventional manner, including washing thereof and heat-stretching for orientation. The heat-stretched oriented fibers were dyed to a medium dark red shade in a bath as described in Example I. In a dyebath containing 10 percent of Wool Fast Scarlet, fibers of this terpolymer were dyed to a very dark red shade. Both dyeings were deeper than the dyeings obtained under equivalent conditions on fibers formed from a copolymer of 95 percent acrylonitrile and 5 percent of 2-vinylpyridine.

*Example III*

A terpolymer of 84 percent acrylonitrile, 11 percent methacrylonitrile, and 5% 2-methyl-5-vinylpyridine was prepared in an aqueous system containing 1.0 percent of potassium persulfate and 0.1 percent of Daxad 11 at a water to monomer ratio of 4:1. The ternary polymer was obtained in a yield of 96.3 percent. It was coagulated, filtered, washed and dried in the usual way, and had a specific viscosity of 0.207 at 0.1 percent concentration in dimethylformamide.

Fibers were formed from the ternary polymer and processed as in Example II. The heat-stretched fibers were dyed a medium dark red shade in a bath as described in Example I. In a dyebath containing the Wool Fast Scarlet dyestuff in a concentration of 10 percent, fibers of this terpolymer were dyed to a very dark shade. Both dyeings were deeper than the dyeings obtained under equivalent conditions on fibers of a copolymer of 95 percent acrylonitrile and 5 percent of 2-methyl-5-vinylpyridine.

This application is a continuation-in-part of our pending application Serial No. 160,584, filed May 6, 1950.

We claim:

1. A ternary polymer of, by weight, from 70 to 84 percent of acrylonitrile, from 1 to 10 percent of 2-methyl-5-vinylpyridine, and from 6 to 20 percent of methacrylonitrile.

2. A ternary polymer of, by weight, about 84 percent of acrylonitrile, about 5 percent of 2-methyl-5-vinylpyridine, and about 11 percent of methacrylonitrile.

References Cited in the file of this patent

UNITED STATES PATENTS

| Number | Name | Date |
|---|---|---|
| 2,462,354 | Brubaker et al. | Feb. 22, 1949 |
| 2,491,471 | Arnold | Dec. 20, 1949 |

FOREIGN PATENTS

| Number | Country | Date |
|---|---|---|
| 597,368 | Great Britain | Jan. 23, 1948 |